United States Patent
Bean et al.

(10) Patent No.: US 7,542,091 B2
(45) Date of Patent: Jun. 2, 2009

(54) DEVICE POWER MANAGEMENT METHOD AND APPARATUS

(75) Inventors: Heather N Bean, Fort Collins, CO (US); Christopher A. Whitman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1790 days.

(21) Appl. No.: 10/016,199

(22) Filed: Dec. 11, 2001

(65) Prior Publication Data

US 2003/0107346 A1    Jun. 12, 2003

(51) Int. Cl.
*H04N 5/225*    (2006.01)
*G06F 11/00*    (2006.01)

(52) U.S. Cl. .............................. 348/372; 714/22
(58) Field of Classification Search .......... 714/22; 348/372
See application file for complete search history.

(56) References Cited

U.S. PATENT DOCUMENTS

| | | | | | |
|---|---|---|---|---|---|
| 5,359,728 | A | * | 10/1994 | Rusnack et al. | 714/5 |
| 5,790,878 | A | * | 8/1998 | Anderson et al. | 713/340 |
| 5,963,255 | A | * | 10/1999 | Anderson et al. | 348/372 |
| 6,263,453 | B1 | * | 7/2001 | Anderson | 714/22 |
| 6,327,001 | B1 | * | 12/2001 | Yamagishi | 348/552 |
| 6,687,839 | B1 | * | 2/2004 | Tate et al. | 713/324 |
| 6,710,809 | B1 | * | 3/2004 | Niikawa | 348/372 |
| 2002/0018137 | A1 | * | 2/2002 | Tsuda | 348/333.02 |
| 2002/0154243 | A1 | * | 10/2002 | Fife et al. | 348/372 |

* cited by examiner

*Primary Examiner*—James M Hannett (57) ABSTRACT

A power management method and associated apparatus allows a device to make maximum use of its battery before replacement or recharging. After a battery failure, the device may be shut down properly and disabled until the battery is replaced or recharged. An exemplary embodiment is described in the context of a digital camera.

15 Claims, 6 Drawing Sheets

DEVICE POWER MANAGEMENT METHOD AND APPARATUS

FIELD OF THE INVENTION

The present invention relates generally to electronic devices and more specifically to battery-powered electronic devices with data storage capabilities.

BACKGROUND OF THE INVENTION

One problem that arises with battery-powered devices is the sudden loss of power due to battery failure. This problem is especially serious in a portable device that stores data such as a digital camera, hand-held computer, or cellular phone because the file system can become corrupted due to the unexpected loss of power.

One way to deal with the problem is to disable operation of the device when the battery charge drops to a predetermined percentage of its capacity. For example, the device may warn the user to cease operation, or the device may prevent further operation, when the battery drops to 20 percent of its capacity. Although this approach prevents sudden, catastrophic power loss, it wastes significant battery capacity and shortens the time between recharges. Moreover, some battery types such as nickel cadmium batteries eventually lose capacity if they are not substantially depleted before being recharged. Therefore, the method of holding battery charge in reserve can shorten the usable life of such batteries.

A more sophisticated approach involves predicting the remaining life of specific batteries or battery types. This approach takes advantage of differences in quality among batteries by allowing the device to operate longer without recharging when a high-quality battery is present. This approach increases development costs because extensive testing and profiling of the wide variety of available batteries is required. Also, the device's software or firmware must be configured to implement multiple power management profiles, increasing complexity.

It is thus apparent that there is a need in the art for an improved power management method for battery-operated devices.

SUMMARY OF THE INVENTION

A method is provided for starting up a battery-powered device after a battery failure. An apparatus is also provided to carry out the method.

Other aspects and advantages of the present invention will become apparent from the following detailed description, taken in conjunction with the accompanying drawings, illustrating by way of example the principles of the invention.

DETAILED DESCRIPTION OF THE INVENTION

Useable battery life in a battery-operated device may be extended by allowing a device to operate until a battery failure occurs. Throughout this detailed description, a "battery failure" denotes a condition in which the battery charge drops below the level required to operate the device. Since most batteries, once the load has been removed, recover sufficiently after a few moments to allow brief operation of the device, that brief period may be used to shut down the device properly until the battery has been replaced or recharged. Once the battery has been replaced or recharged, the device may take steps to correct any anomalies in its stored data that may have been caused by the sudden loss of power. For example, the device may ensure the integrity of its file system, in particular its file allocation table (FAT), by deleting any incomplete FAT entries that were not properly written during the battery failure.

Figure 1A:
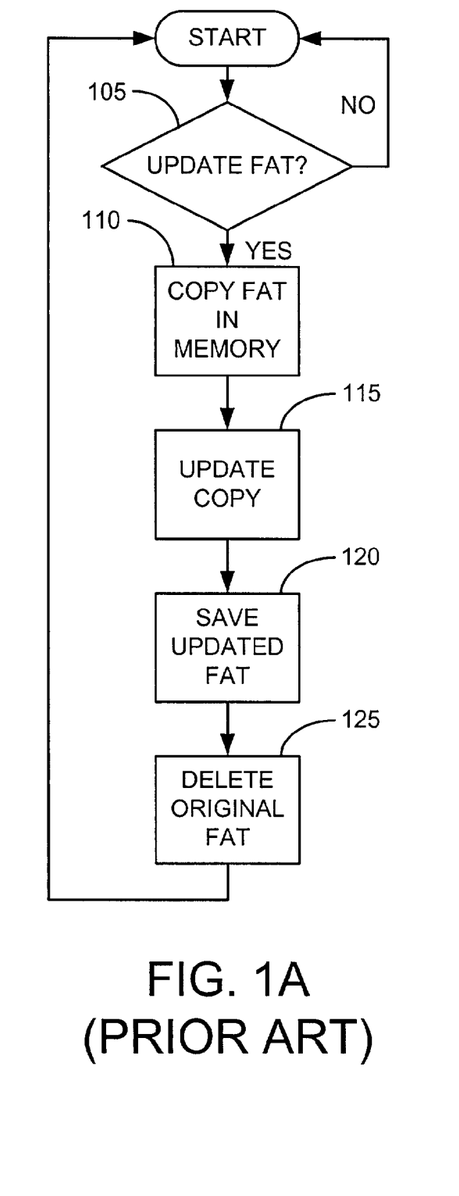
FIGS. 1A and 1B are flowcharts showing exemplary prior-art methods for providing a robust file system used by the invention.
Figure 1B:
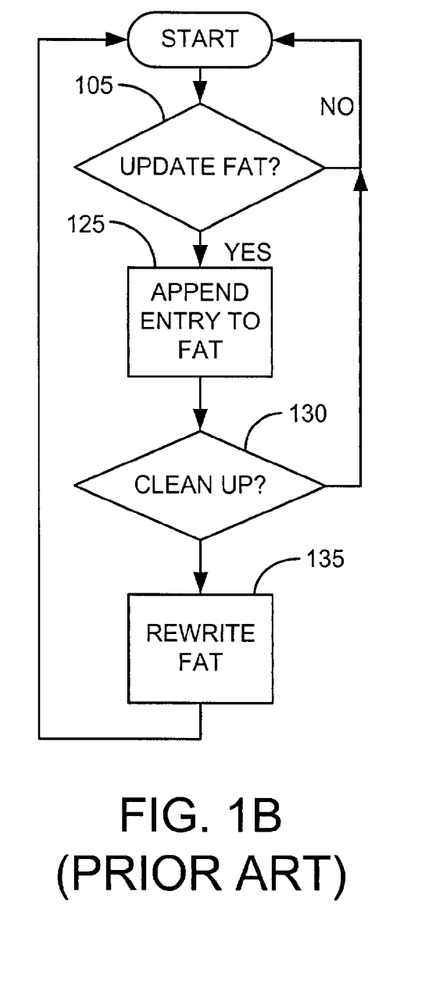

The approach just described assumes an underlying robust file system that is designed to prevent the loss of more than one data object (e.g., the most recently created data object) due to an unexpected loss of power. Although such robust file systems are well known in the art, two simple examples are provided in FIGS. 1A and 1B. Both examples include a FAT, although not all file systems use a FAT, as those skilled in the art will recognize. In either case, the file system includes a method for keeping track of files and where they are located. In FIG. 1A, a need to update the FAT at 105 causes the FAT to be copied from non-volatile storage such as flash memory to random access memory (RAM) at 110. The update is made to the copy at 115. If power is suddenly lost due to a battery failure, the original FAT is still stored in non-volatile memory, and only the newest entry in the copy is lost. Under normal conditions, the updated FAT created from the copy is saved to non-volatile memory at 120, and the original FAT is deleted from non-volatile memory at 125. In FIG. 1B, a new entry is appended to the FAT in non-volatile memory at 125, eliminating the need to copy and rewrite the entire FAT each time an update is made. Periodically, when suitable criteria are satisfied at 130 (e.g., when the battery is well charged and the device is turned on but idle), the FAT is rewritten to eliminate out-of-date entries at 135. The methods shown in FIGS. 1A and 1B are merely examples. Any file system robust against unexpected power loss, including those not employing a FAT, may be used in implementing the invention.

Figure 2:
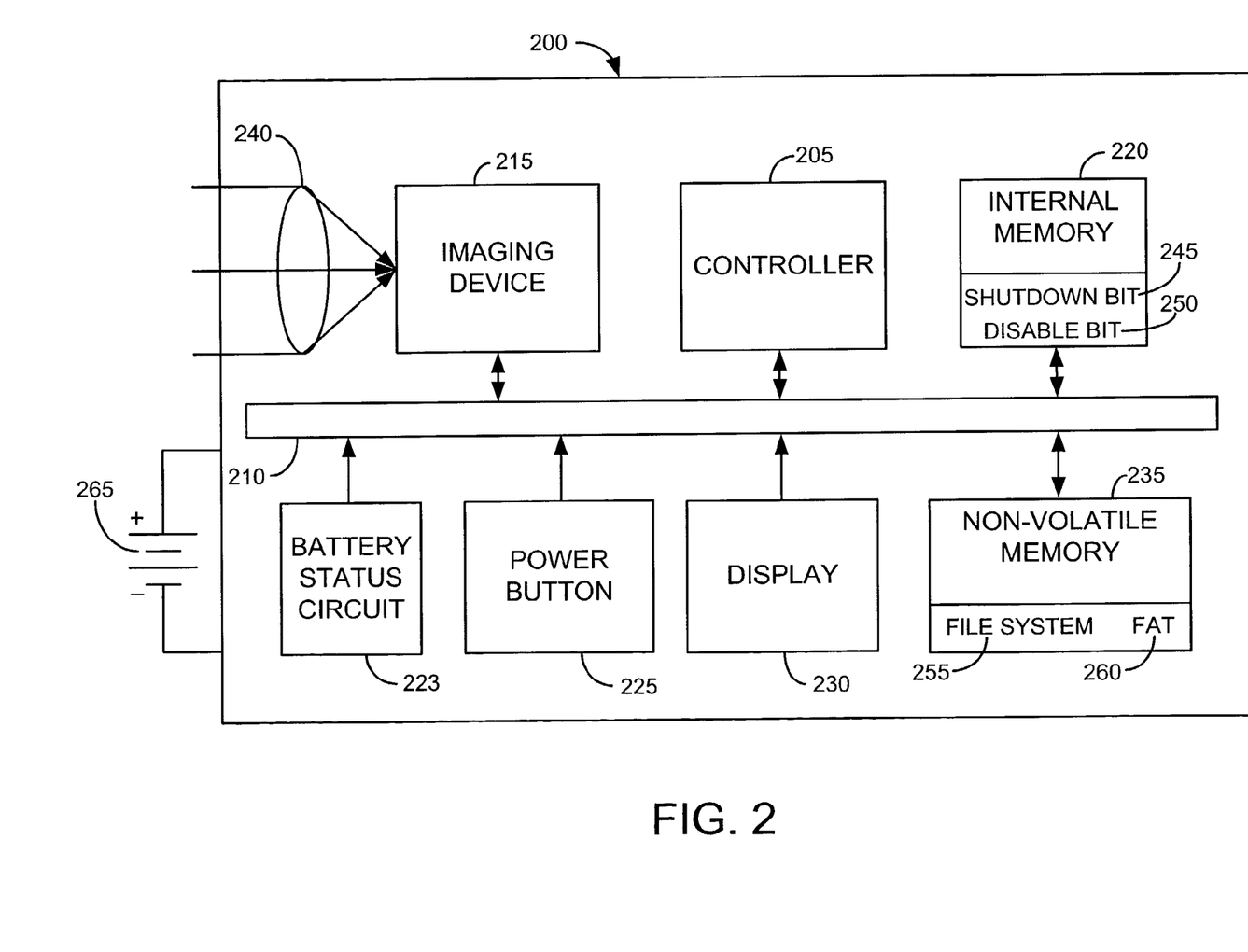
FIG. 2 is a block diagram of a digital camera in accordance with an exemplary embodiment of the invention.

The invention may be applied to a wide variety of battery-operated devices such as digital cameras, hand-held computers, personal digital assistants (PDAs), electronic organizers, or cellular phones. FIG. 2 is a block diagram of a digital camera 200 in accordance with an exemplary embodiment of the invention. In FIG. 2, controller 205 communicates over data bus 210 with imaging device 215, internal memory 220, battery status circuit 223, power button 225, display 230, and nonvolatile memory 235. Imaging device 215 converts optical images received from optical system 240 to digital images. In a typical implementation, imaging device 215 comprises a charge-coupled device (CCD), an analog-to-digital converter (A/D), a gain control, and a digital signal processor (DSP) (not shown in FIG. 2). Internal memory 220 may comprise both RAM and non-volatile memory such as flash memory. The RAM is used to hold digital images temporarily until they can be transferred to non-volatile storage. A shutdown bit 245 and a disable bit 250, which will be explained in a later portion of this description, may be stored in the nonvolatile portion of internal memory 220. Non-volatile memory 235, which is typically of the removable type, is used for long-term storage of digital images produced by imaging device 215. Non-volatile memory 235 includes a file system 255, of which one key component is FAT 260. Digital camera 200 may be powered by a battery 265. When digital camera 200 is off, power may be removed from all components except controller 205 so that controller 205 can detect changes in state of power button 225.

Controller 205, via battery status circuit 223, may determine the charge status of battery 265. For example, battery status circuit 223 may measure the voltage of battery 265. Alternatively, battery status circuit 223 may comprise an electromechanical mechanism that detects the removal and insertion of battery 265. Techniques for measuring battery voltage and detecting battery insertion and removal are well known in the art. Throughout this detailed description, the charge status of battery 265 will be considered "favorable" whenever battery 265 is capable of powering digital camera 200 for a period longer than a brief shutdown sequence performed whenever digital camera 200 is powered off. Otherwise, the charge status of battery 265 will be considered "unfavorable."

Figure 3:
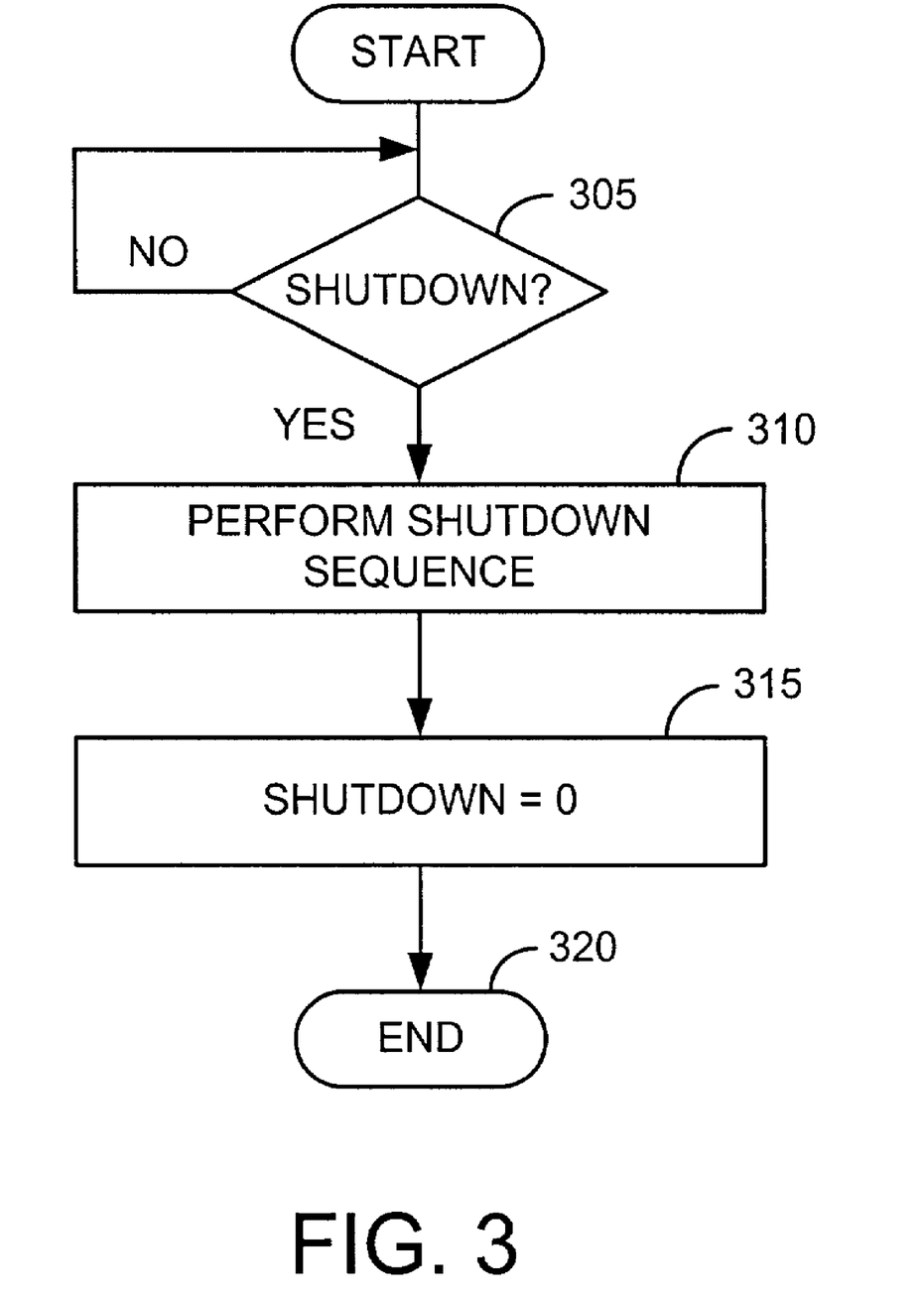
FIG. 3 is a block diagram of a method for shutting down the digital camera shown in FIG. 2 in accordance with an exemplary embodiment of the invention.

In an exemplary embodiment of the invention, shutdown bit 245 is used to determine whether digital camera 200 was shut down properly. Shutdown bit 245 is nominally cleared (logic "0") when digital camera 200 is off. When digital camera 200 is turned on, shutdown bit 245 is set (logic "1") to correspond to the power-on state. When digital camera is shut down normally, shutdown bit 245 is cleared. The normal shutdown procedure is summarized in the flowchart of FIG. 3. If a request to turn off digital camera 200 is received at 305, a shutdown sequence is performed at 310. The shutdown sequence may comprise such tasks as removing power from all components of digital camera 200 except controller 205, placing control lines in a high-impedance state, removing charge from a strobe (flash unit), and retracting a lens included in optical system 240. Controller 205 remains powered to sense subsequent input from power button 225 after digital camera 300 has been turned off. At 315, shutdown bit 245 is cleared to indicate a normal shutdown, and the process ends at 320.

If during operation of digital camera 200 power is suddenly lost due to a battery failure, the normal shutdown sequence is not performed, and shutdown bit 245 is not cleared. The next time digital camera 200 is started up, controller 205 can detect that digital camera 200 was not shut down properly, indicating the possibility of a battery failure. Disable bit 250 may be used to indicate that a battery failure has occurred and that further operation of digital camera 200 should be disabled until battery 265 is recharged or replaced. For example, if shutdown bit 245 is found to be set upon start up, indicating a possible battery failure, the status of battery 265 may be determined via battery status circuit 223 as explained previously. If the status of battery 265 is unfavorable, the residual charge on battery 265 may be used to perform the shutdown sequence and to set disable bit 250, indicating that further operation of the device is to be prevented until battery 265 is recharged or replaced. Further attempts to start up digital camera 200 will fail until battery 265 is recharged or replaced, at which time digital camera 200 may be started up normally, disable bit 250 cleared, and the integrity of file system 255 checked.

Figure 4A:
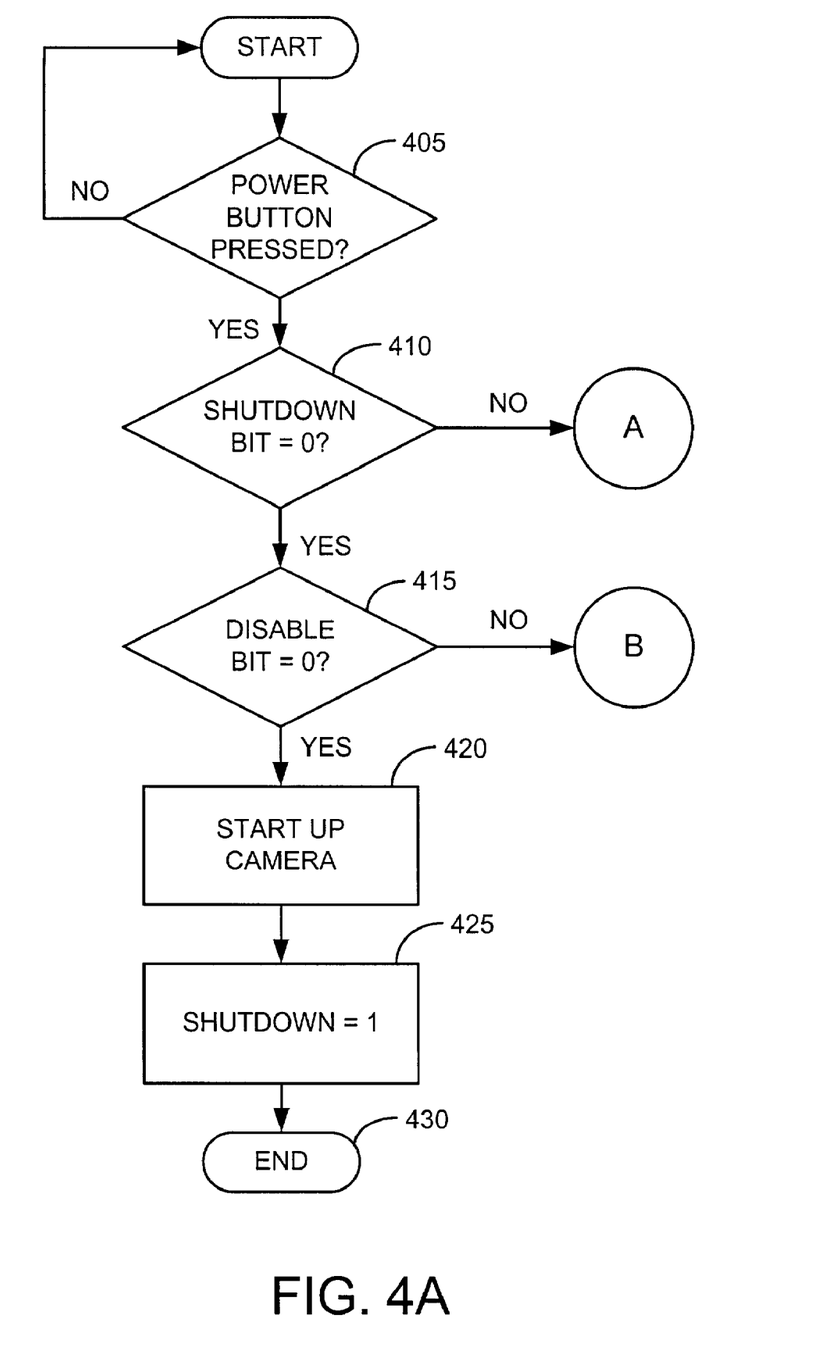
FIGS. 4A-4C are flowcharts of a method for starting up the digital camera shown in FIG. 2 in accordance with an exemplary embodiment of the invention.
Figure 4B:
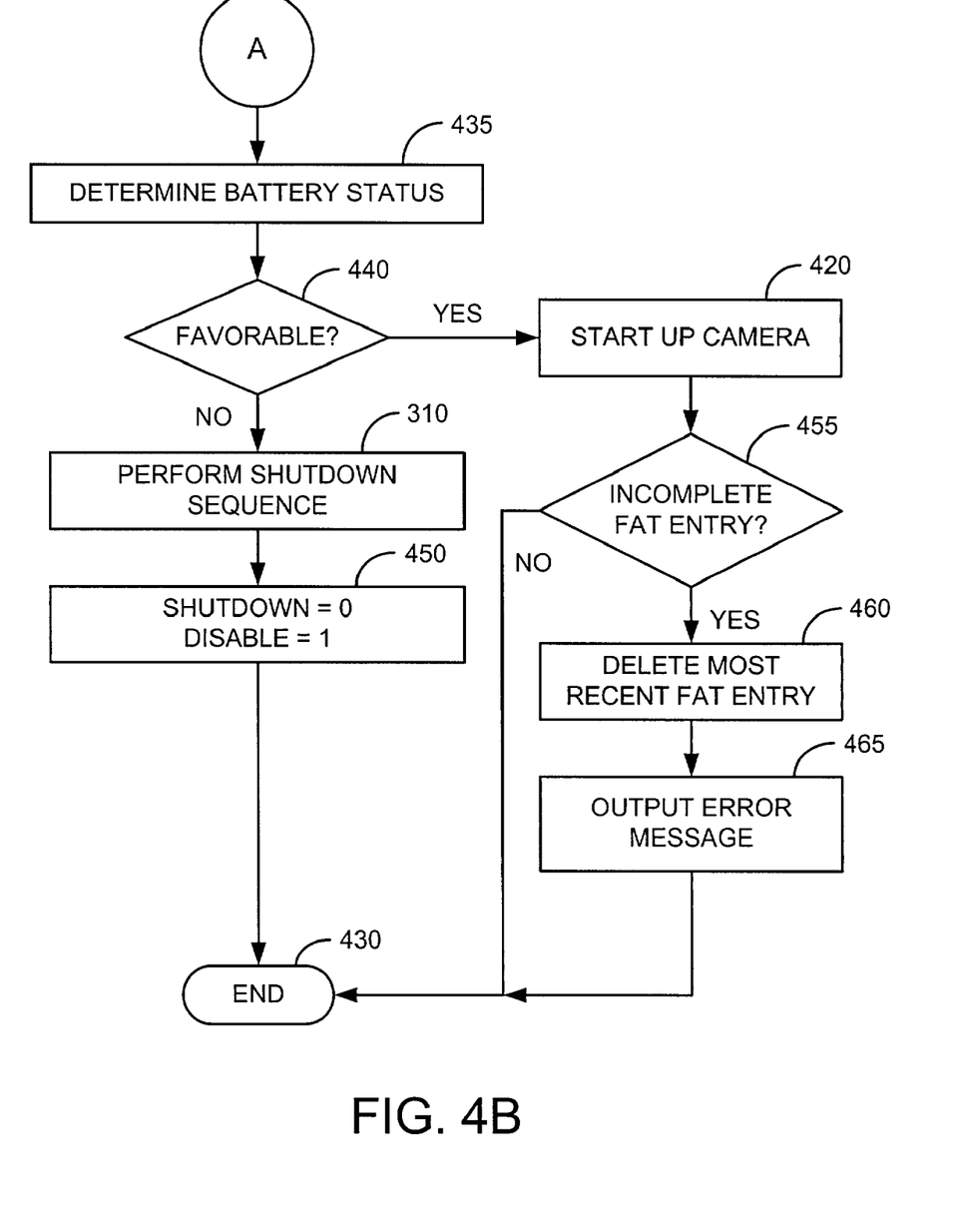
Figure 4C:
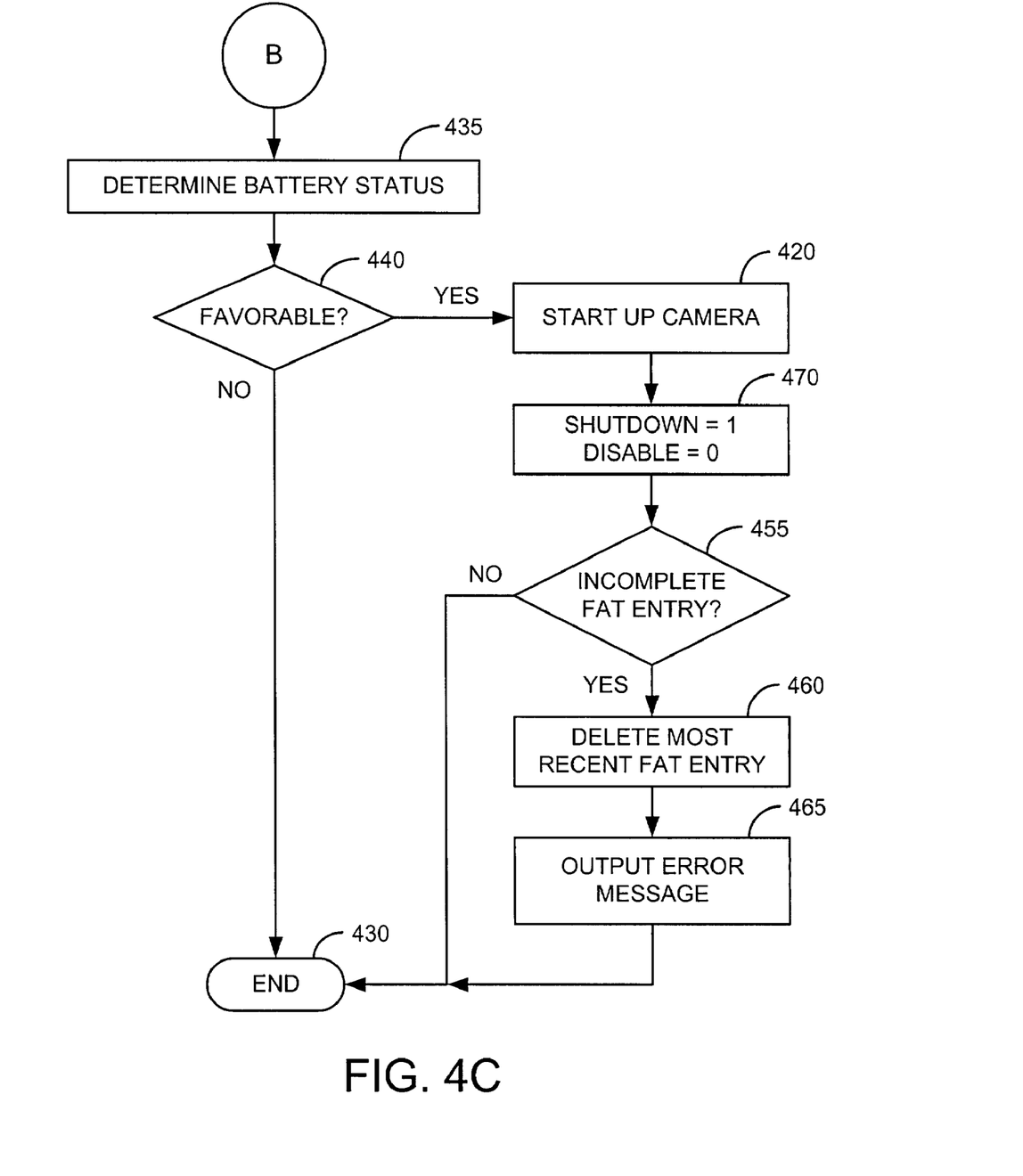

FIGS. 4A-4C are flowcharts of a method for starting up digital camera 200 in accordance with an exemplary embodiment of the invention. The method shown in FIGS. 4A-4C may be performed whenever digital camera 200 is off and power button 225 is pressed to activate the device. If power button 225 is pressed at 405, the status of shutdown bit 245 is polled at 410. If shutdown bit 245 is cleared (logic "0"), the status of disable bit 250 is polled at 415. If disable bit 250 is also cleared (logic "0"), digital camera 200 is started up normally at 420. Shutdown bit 245 is then set (logic "1") at 425, and the start-up process terminates at 430. If shutdown bit 245 is set (logic "1") at 410, controller 205 can determine that digital camera was not shut down properly, possibly due to a battery failure. In that case, control proceeds to FIG. 4B.

In FIG. 4B, the status of battery 265 is obtained from battery status circuit 223 at 435. If the status is favorable at 440 (e.g., battery 265 has been recharged or replaced since the battery failure), digital camera is started up at 420. If the status of battery 265 is unfavorable at 440, the shutdown sequence is performed at 310. Following the shutdown sequence, shutdown bit 245 is cleared and disable bit 250 is set at 450, after which the process terminates at 430. Disable bit 250 is set at 450 to indicate that digital camera 200 may not be operated again until battery 265 is either replaced or recharged. If the status of battery 265 was favorable at 440 and digital camera 200 started up successfully at 420, file system 255 may have been corrupted by the failure of battery 265. In this particular exemplary embodiment, it is assumed that new FAT entries are appended as explained in connection with FIG. 1B. At 455, controller 205 checks for an incomplete FAT entry. If one is found, it may be deleted at 460, and an error message may be output to display 230 at 465 to warn a user that the last image captured has been lost. In other embodiments, the FAT may be copied before being modified as in FIG. 1A. In that case, an incompletely saved FAT may have to be deleted, not just a single entry. In either case, however, at most one FAT entry (the most recent one) is lost.

If shutdown bit 245 is cleared (logic "0") at 410 in FIG. 4A and disable bit 250 is set (logic "1") at 415, control proceeds to 435 in FIG. 4C, where the status of battery 265 is determined from battery status circuit 223. In this case, the steps shown in FIG. 4B have already been performed. That is, a battery failure has occurred, and digital camera has been shut down using the residual power of battery 265. Any further attempt to turn on digital camera 200 leads to 435 in FIG. 4C. If the battery status is unfavorable at 440 in FIG. 4C, the process ends at 430 without digital camera 200 being started up because disable bit 250 is set. If the status of battery 265 is favorable at 440, digital camera 200 is started up at 420, after which shutdown bit 245 is set and disable bit 250 is cleared at 470. Processing then proceeds as indicated in FIG. 4B (steps 455, 460, and 465).

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for managing power in a battery-operated device, comprising:

allowing the device to operate until a battery failure occurs, the battery failure comprising a condition in which the battery's charge drops below a level required to operate the device;

determining, upon an attempt to restart the device after the battery failure, that the battery has insufficient charge to support further operation of the device;

shutting down the device properly using residual charge in the battery, the battery having recovered sufficiently during a brief period between the battery failure and the attempt to restart the device to support shutting down the device properly; and disabling further operation of the device until the battery has been recharged or replaced.

2. The method of claim 1, further comprising:

starting up the device and ensuring the integrity of a file system in the device after the battery has been recharged or replaced.

3. The method of claim 2, wherein ensuring the integrity of a file system in the device comprises:

detecting an incomplete file-allocation-table entry;
deleting the incomplete file-allocation-table entry; and
outputting an error message.

4. The method of claim 1, wherein the device comprises a digital camera.

5. The method of claim 4, wherein shutting down the device properly comprises retracting a lens of the digital camera.

6. A device, comprising:

a battery;
a circuit to detect a status of the battery, and
control logic configured to carry out a method comprising:
    allowing the device to operate until a battery failure occurs, the battery failure comprising a condition in which the battery's charge drops below a level required to operate the device;
    determining, upon an attempt to restart the device after the battery failure, that the status of the battery is unfavorable to continued operation of the device;
    shutting down the device properly using residual charge in the battery, the battery having recovered sufficiently during a brief period between the battery failure and the attempt to restart the device to support shutting down the device properly; and
    disabling further operation of the device until the battery has been recharged or replaced.

7. The device of claim 6, wherein the method further comprises starting up the device and ensuring the integrity of a file system in the device after the battery has been recharged or replaced.

8. The device of claim 7, wherein ensuring the integrity of a file system in the device comprises:

detecting an incomplete file-allocation-table entry;
deleting the incomplete file-allocation-table entry; and
outputting an error message.

9. The device of claim 6, wherein the device comprises a digital camera.

10. The device of claim 9, wherein shutting down the device properly comprises retracting a lens of the digital camera.

11. The device of claim 6, wherein the control logic comprises a shutdown bit to detect when the device has experienced a battery failure.

12. The device of claim 6, wherein the control logic comprises a disable bit to prevent the device from being operated when the stats of the battery is unfavorable.

13. A device, comprising:

a battery;
means for detecting a stats of the battery; and
means for carrying out a method comprising:
    allowing the device to operate until a battery failure occurs, the battery failure comprising a condition in which the battery's charge drops below a level required to operate the device;
    determining, upon an attempt to restart the device after the battery failure, that the status of the battery is unfavorable to continued operation of the device;
    shutting down the device properly using residual charge in the battery, the battery having recovered sufficiently during a brief period between the battery failure and the attempt to restart the device to support shutting down the device properly; and
    disabling further operation of the device until the battery has been recharged or replaced.

14. The device of claim 13, wherein the method further comprises starting up the device and ensuring the integrity of a file system in the device after the battery has been recharged or replaced.

15. The device of claim 14, wherein ensuring the integrity of a file system in the device comprises:

detecting an incomplete file-allocation-table entry;
deleting the incomplete file-allocation-table entry; and
outputting an error message.

* * * * *

UNITED STATES PATENT AND TRADEMARK OFFICE
CERTIFICATE OF CORRECTION

PATENT NO.         : 7,542,091 B2
APPLICATION NO. : 10/016199
DATED                  : June 2, 2009
INVENTOR(S)        : Heather N Bean et al.

It is certified that error appears in the above-identified patent and that said Letters Patent is hereby corrected as shown below:

In column 6, line 16, in Claim 12, delete "stats" and insert -- status --, therefor.

In column 6, line 19, in Claim 13, delete "stats" and insert -- status --, therefor.

Signed and Sealed this

Third Day of November, 2009

David J. Kappos
*Director of the United States Patent and Trademark Office*